United States Patent
Grabinger et al.

(10) Patent No.: US 7,446,494 B2
(45) Date of Patent: Nov. 4, 2008

(54) HVAC ACTUATOR HAVING TORQUE COMPENSATION

(75) Inventors: Cory L. Grabinger, Maple Grove, MN (US); Ivo Chromy, Brno (CZ); David Cermak, Brno (CZ); Scott D. McMillan, Golden Valley, MN (US)

(73) Assignee: Honeywell International Inc., Morristown, NJ (US)

( * ) Notice: Subject to any disclaimer, the term of this patent is extended or adjusted under 35 U.S.C. 154(b) by 134 days.

(21) Appl. No.: 11/548,123

(22) Filed: Oct. 10, 2006

(65) Prior Publication Data

US 2008/0084173 A1 Apr. 10, 2008

(51) Int. Cl.
G05B 5/00 (2006.01)

(52) U.S. Cl. .................. 318/471; 318/400.07; 318/432; 417/12; 417/14

(58) Field of Classification Search .................. 318/432, 318/434, 400.07, 471; 417/12, 14
See application file for complete search history.

(56) References Cited

U.S. PATENT DOCUMENTS

| | | | |
|---|---|---|---|
| 3,967,227 A | 6/1976 | Clarke et al. | |
| 5,081,405 A | 1/1992 | Nelson | |
| 5,087,866 A | 2/1992 | Smith | |
| 5,440,486 A * | 8/1995 | Rudzewicz et al. | 701/36 |
| 5,617,001 A * | 4/1997 | Nacewicz et al. | 318/788 |
| 5,710,498 A | 1/1998 | Yutkowitz et al. | |
| 5,804,696 A | 9/1998 | Seberger et al. | |
| 5,835,302 A | 11/1998 | Funches et al. | |
| 6,076,368 A * | 6/2000 | Noble | 62/217 |
| 6,279,374 B1 | 8/2001 | Irokawa et al. | |
| 6,318,966 B1 * | 11/2001 | Madara et al. | 417/12 |
| 6,495,981 B2 * | 12/2002 | Romanowich et al. | 318/434 |
| 6,548,981 B1 | 4/2003 | Ishii et al. | |
| 6,577,978 B1 | 6/2003 | Annan et al. | |
| 6,593,716 B1 | 7/2003 | Lange et al. | |
| 6,791,219 B1 | 9/2004 | Eric et al. | |
| 2002/0050898 A1 | 5/2002 | Olsson | |
| 2003/0183791 A1 | 10/2003 | Meinhof | |
| 2005/0034539 A1 | 2/2005 | Tan et al. | |

* cited by examiner

Primary Examiner—Rina I Duda

(57) ABSTRACT

A method and system are disclosed for adjusting the torque of a motor for a HVAC actuator based upon one or more operating conditions of the HVAC actuator. One illustrative HVAC actuator includes an actuated part, a motor for providing a torque to move the actuated part, a detector for detecting an operating condition in or around the HVAC actuator, and a controller for adjusting the torque in accordance with the detected operating condition.

21 Claims, 7 Drawing Sheets

HVAC ACTUATOR HAVING TORQUE COMPENSATION

FIELD

The present invention generally relates to HVAC actuators, and more particularly, to HVAC actuators with torque ratings.

BACKGROUND

HVAC actuators are used in a wide variety of HVAC systems and applications. Such actuators can include, for example, air flow damper actuators, water valves, gas valves, as well as other actuators. In many cases, a motor is used to drive the actuator between actuated positions. Typically, a controller is used to provide control signals to cause the motor to drive the actuator to a desired actuated position.

In some applications, such as some commercial applications, a number of operating characteristics are specified for the HVAC actuator. The selection of a particular HVAC actuator for a particular application is often based, at least in part, on the specified operating characteristics. The operating characteristics are typically specified over certain operating conditions. The operating conditions may include, for example, an operating temperature range, an operating voltage range, an operating current range, the age or level of use of the HVAC actuator, and/or any number of other specified operating conditions and/or parameters.

In some cases, one of the operating characteristics is a torque rating. A torque rating typically specifies the minimum torque that the HVAC actuator will produce when the HVAC actuator is operating within the specified operating conditions. For example, an HVAC actuator may have a torque rating of 5 Nm over a specified operating temperature range of −40 degrees Fahrenheit to 150 degrees Fahrenheit.

The actual torque that is produced by the HVAC actuator may vary with some or all of the specified operating conditions and/or parameters, such as temperature and/or age or level of use of the HVAC actuator. As such, in order to meet the torque rating for the HVAC actuator across all specified operating conditions and/or parameters, HVAC actuators are often produced to meet the torque rating requirement under the worst case operating conditions. Under nominal or best case operating conditions, the HVAC actuators often produce more torque than the torque rating. For example, an HVAC actuator may be desired to produce the rated torque level of the HVAC actuator when operating at the coldest operating temperature. At other temperatures, such as at nominal or higher temperatures, the HVAC actuator may actually produce more torque than is required to meet the rated torque level of the HVAC actuator, and in some cases, significantly more torque.

The variation in torque of an HVAC actuator may result from a number of factors, including the susceptibility of different components of the HVAC actuator to the various operating conditions. For example, the performance of the motor, gear train, and/or electronic controls, as well as other components, may vary with the operating conditions. It has been observed that a decrease in the operating temperature can stiffen or otherwise reduce the effectiveness of lubrication that is often used in the motor, gear train and/or actuated part, which may decrease the available motor torque that is available at the actuated part of the HVAC actuator. Likewise, significant use of the HVAC actuator over time can cause the gear train to become worn, which can also reduce the available motor torque that is available at the actuated part of the HVAC actuator over time. Thus, to meet the rated torque level under the worst case operating conditions, many HVAC actuators actually produce more torque than is required to meet the torque rating under nominal or best case operating conditions.

SUMMARY

The following summary is provided to facilitate an understanding of some of the innovative features unique to the present invention and is not intended to be a full description. A full appreciation of the invention can be gained by taking the entire specification, claims, drawings, and abstract as a whole.

The present invention relates generally to HVAC actuators, and more particularly, to HVAC actuators with torque ratings. The torque output of an HVAC actuator may be characterized over one or more operating conditions. A detector may be provided for sensing one or more of the operating conditions, and the torque level of the HVAC actuator may be adjusted depending on the detected operating condition(s). In some cases, the torque level of the HVAC actuator may be adjusted to compensate for the variations in torque over the expected operating conditions of the HVAC actuator to produce a relatively constant torque level that is at or near the rated torque level, but this is not required.

As such, and in one illustrative embodiment, an HVAC actuator is provided that has torque compensation to help compensate the torque of the HVAC actuator based on the current operating condition(s) and/or parameters detected by one or more detectors. In some cases, the HVAC actuator may include an actuated part, a motor, one or more detectors and a controller. The motor may provide a torque to move the actuated part to a desired actuated position. The torque required to drive the actuated part to the desired actuated position may vary, depending on the current operating conditions of the HVAC actuator. The one or more detectors may determine at least one current operating condition of the HVAC actuator, and the controller may adjust the torque produced by the motor depending to the detected operating condition(s) of the HVAC actuator. The one or more detectors may be suitable for detecting any number of operating condition(s), and may include, for example, a temperature detector for detecting a current operating temperature, a clock or counter to detect the age or level of use of the HVAC actuator, a voltage detector for detecting the voltage that is currently being supplied to the HVAC actuator, a current detector for detecting the current that is currently being supplied to the HVAC actuator, and/or any other suitable operating condition detector, as desired.

In one example, and when the detector includes a temperature sensor, the controller may read the current temperature detected by the temperature detector, and may adjust a signal provided to the motor such that the torque supplied by the motor causes the HVAC actuator to produce a desired torque level at the actuated part of the HVAC actuator, sometimes at or near the rated torque level. In some cases, the controller may include predetermined compensation parameters that are used to properly compensate the torque of the HVAC actuator over the detected operating conditions and/or parameters (e.g. temperature).

For example, the controller may increase the torque that is supplied by the motor at lower detected temperatures, and reduce the torque that is supplied by the motor at higher detected temperatures. In some cases, this may result in an HVAC actuator that has a relatively constant torque output at the actuated part of the HVAC actuator over the entire operating temperature range of the HVAC actuator.

In some cases, the controller may adjust the amount of current in a drive signal that is provided to the motor based, as least in part, on the detected operating condition(s). In some cases, the controller may first determine if the detected operating condition is within a predefined range, above, and/or below a predefined threshold. If the detected operating condition is within the predefined range, above and/or below the predefined threshold, the controller may adjust or recalculate the torque limits for the HVAC actuator based on the detected operating condition(s). In some cases, if the detected operating condition is not within a predefined range, above and/or below the predefined threshold, the controller may not change the torque limits and instead use default torque limits. It should be understood, however, that this is only illustrative, and other methods and apparatus are contemplated for adjusting the torque of an HVAC actuator based on the current operating conditions of the HVAC actuator.

BRIEF DESCRIPTION

The invention may be more completely understood in consideration of the following detailed description of various illustrative embodiments of the invention in connection with the accompanying drawings, in which.

DETAILED DESCRIPTION

Figure 1:
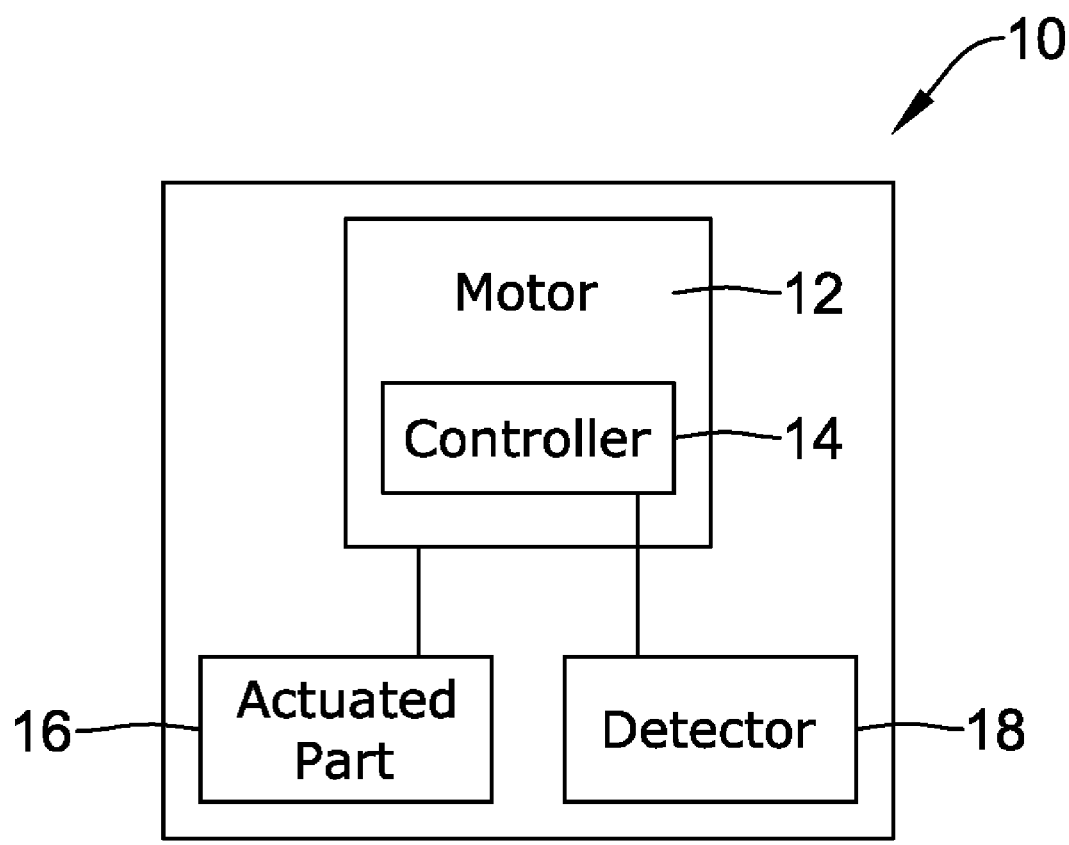
FIG. 1 is a schematic diagram of an illustrative HVAC actuator.

The following description should be read with reference to the drawings wherein like reference numerals indicate like elements throughout the several views. The detailed description and drawings show several embodiments which are meant to be illustrative of the claimed invention.

The present invention relates generally to HVAC actuators, and more particularly, to HVAC actuators with torque ratings. The torque output of an HVAC actuator may be characterized over one or more operating conditions. A detector may be provided for sensing one or more of the operating conditions, and the torque level of the HVAC actuator may be adjusted depending on the detected operating condition(s). In some cases, the torque level of the HVAC actuator may be adjusted to compensate for the variations in torque over the expected operating conditions of the HVAC actuator to produce a relatively constant torque level that is at or near the rated torque level, but this is not required.

While not meant to be limiting, an HVAC actuator having a torque rating is presented below as an example to help the reader gain a clear understanding of various aspects of the present invention. However, it should be recognized that the present invention can be applied to any type of actuator, such as, for example, a linear output actuator or any other suitable actuator, depending on the application at hand.

FIG. 1 is a schematic diagram of an illustrative HVAC actuator 10 in accordance with the present invention. The illustrative HVAC actuator 10 includes an actuated part 16, an electric motor 12, a controller 14, and a detector 14. The actuated part 16 may be, for example, an air flow damper, a water valve, a gas valve, and/or any other suitable actuatable part. The electric motor 12 can be selectively activated by the controller 14 to move the position of the actuated part 16 to a desired actuated position.

In the illustrative embodiment, the electric motor 12 may have a drive signal input coupled to the controller 14, and may further have a drive output for moving the actuated part 16. The drive output may include, for example, a drive shaft (not shown), a gear train (not shown), and/or any other suitable drive mechanism, as desired. In some cases, the drive output of the motor 12 may include a gear train that includes set or system of gears configured to transfer rotational torque of the motor 12 to the actuated part 16. Alternatively, or in addition, the drive output of the motor 12 may include a drive shaft that includes a drive rod configured to transfer rotational torque from the motor 12 to the actuated part 16. These are only illustrative. The gear train and/or drive shaft may also include a lubricant, such as oil or grease, to help increase the efficiency of the transfer torque from the motor 12 to the actuated part 16.

In some cases, the electric motor 12 may receive the drive signal from the controller 14, and, in response to the drive signal, provide a level of torque to move the position of the actuated part 16. In some cases, the drive signal may control the level of torque produced by the motor 12.

Under some circumstances, the torque at the actuated part 16 may vary according to the current operating conditions or parameters of the HVAC actuator 10. Such operating parameters may include, but are not limited to, temperature, duration of time, time or amount of use of the actuator, humidity, and/or any other operating parameter or condition that may affect the amount of torque delivered to the actuated part 16.

In some cases, the controller 14 may be configured to receive communications from an HVAC system, such as, to receive a call to move the position of the actuator part 16 to a desired position. In response to such a request, the controller 14 may send a signal to the motor 12 (or motor controller) to drive the motor 12. Additionally, and in the illustrative embodiment, the controller 14 may be coupled to the detector 18, and may be configured to receive a signal that is related to the detected operating condition or parameter from the detector 18. In some cases, the controller 14 may be programmed or otherwise configured to adjust the torque level of the electric motor 12 according to the detected operating condition or parameters of the HVAC actuator 10. In some cases, the controller 14 may be programmed or otherwise configured to adjust the torque level of the electric motor 12 such that a relatively constant level of torque is supplied to the actuated part 16 over a wide range of operating conditions.

In some cases, the electric motor 12 may include the controller 14. For example, many DC brushless motors include a controller (e.g. microprocessor or microcontroller) for controlling the commutation of the motor during operation of the motor 12. When so provided, the controller 14 may be implemented using the controller of the DC brushless motor. However, this is not required and it is contemplated that the controller 14 may be provided separate from the motor 12, if desired.

In the illustrative embodiment, the detector 18 is able to detect one or more current operating conditions or parameters of the HVAC actuator 10. Detector 18 may be coupled to controller 14, and may be configured to communicate with the controller 14 to relay one or more signals that are related to the detected operating condition or parameter of the HVAC actuator 10. The controller 14 may receive the one or more signals, and in response, selectively adjust the torque level produced by the motor 12. The detector 18 may be suitable for detecting any number of operating condition(s) or parameters, and may include, for example, a temperature detector for detecting a current operating temperature, a clock or counter to detect the age or level of use of the HVAC actuator, a voltage detector for detecting the voltage that is currently being supplied to the HVAC actuator, a current detector for detecting the current that is currently being supplied to the HVAC actuator, and/or any other suitable operating condition detector, as desired.

It has been observed that a change in one or more operating conditions or parameters may affect, for example, the motor 12, the gear train (not shown), and/or the electronics of the HVAC actuator 10. For example, the motor 12, gear train (not shown), and the electrical components may be susceptible to temperature changes in the operating environment. A change in temperature can, for example, affect the viscosity of the lubricants, such as oil and grease, in the motor 12 and/or the gear train. As the temperature of the HVAC actuator 10 decreases, the lubricant of the motor and/or gear train may stiffen, thereby decreasing the motor torque that is available at the actuated part 16. As such, to provide the same level of torque to the actuated part 16 when the temperature decreases, the torque supplied by the motor 12 may need to be increased.

In another example, the parts or gears of an HVAC actuator 10 may tend to loosen or wear over time, and with extended use, may decrease the motor torque that is available at the actuated part 16. To compensate for these changes, the controller 14 may adjust the torque provided by the motor 12 to compensate for the changes in torque caused by the age or the use of the HVAC actuator 10. In some cases, the controller 14 may include a timer or counter that keeps track of the age and/or use of the HVAC actuator 10. The controller may use this parameter to adjust the torque that supplied by the motor. In this case, the timer or counter, which may be implemented in software and/or hardware, may correspond to the detector 18 of FIG. 1.

Figure 2:
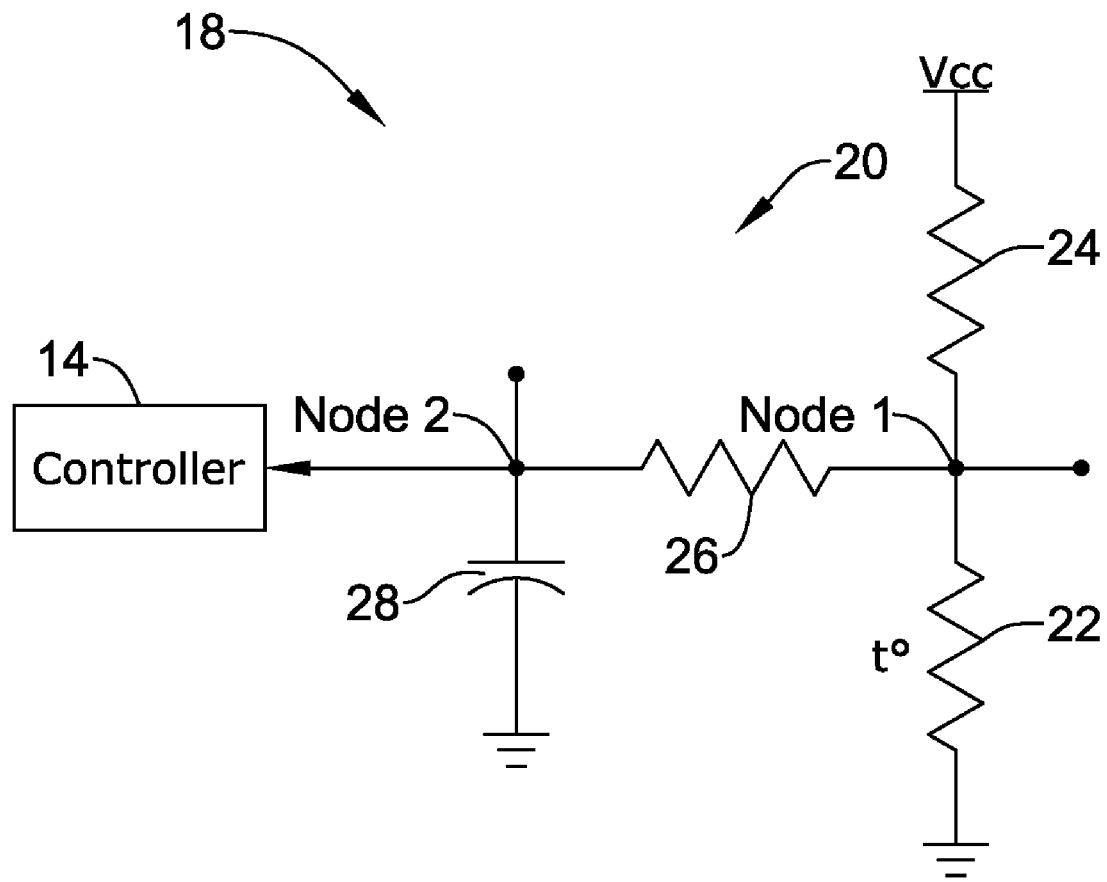
FIG. 2 is a schematic diagram of an illustrative detector for the HVAC actuator of FIG. 1.

FIG. 2 is a schematic diagram of an illustrative detector 18 of the HVAC actuator 10 of FIG. 1. The illustrative detector 18 may be a temperature detector, and may include a circuit 20 for sensing the temperature in or around the HVAC actuator 10. The sensing circuit 20 may be coupled to the controller 14 of the HVAC actuator 10 and may send a signal to the controller 14. The signal may be based, at least in part, on the operating temperature in or around the HVAC actuator 10.

To help sense the temperature of the HVAC actuator 10, the sensing circuit 20 may include a thermistor 22 or any other suitable device or element. A thermistor 22 is a type of resistor that has a relatively high temperature coefficient, where the resistance of the thermistor 22 changes with temperature in a known manner. In one instance, and assuming the relationship between resistance and temperature is linear, the change in resistance of the thermistor 22 may be related to a change in temperature as follows:

$$\Delta R = k \Delta T$$

Where:
 $\Delta R$=change in resistance
 $\Delta T$=change in temperature
 k=first-order temperature coefficient of resistance If k is positive, the resistance of the thermistor 22 increases with increasing temperature, and if k is negative, the resistance of the thermistor 22 decreases with increasing temperature.

The illustrative sensing circuit 20 shown in FIG. 2 also includes one or more supporting circuit components including two resistors 24 and 26 and a capacitor 28. The two resistors 24 and 26 may have temperature coefficients that are significantly smaller than the thermistor 22, and in many cases can be considered negligible. The first resistor 24 may be connected between $V_{CC}$ and node 1. In the illustrative embodiment, $V_{CC}$ may be a voltage source, such as, for example 5 volts. The thermistor 22 is shown connected between node 1 and ground. The second resistor 26 may be coupled between node 1 and node 2. The capacitor 28 may be connected between node 2 and ground. Node 2 may also be connected to the controller 14, such as for example, a microprocessor for a DC brushless motor or a separate controller 14. In some cases, node 2 may be connected to an A/D input of a controller 14.

In the illustrative embodiment of FIG. 2, the first resistor 24 may be 27.4 kiloohms, the second resistor 26 may be 4.99 kiloohms, and the capacitor 28 may be 0.1 microfarads. It is contemplated that these values are only illustrative, and any suitable resistance and capacitor values, as well as any circuit configuration, may be used as desired. While two resistors 24 and 26 and one capacitor 28 are shown in FIG. 2, it is contemplated that any number of circuit components may be used to produce a signal for the controller 14 that is based, at least in part, on the temperature in or around the HVAC actuator 10, as desired.

While the detector 18 has been described in FIG. 2 with reference to a temperature sensing circuit 20, it is not meant to be limiting, and any suitable detector may be used to detect any suitable HVAC operating condition or parameter, as desired. For example, it is contemplated that the detector 18 may detect the time or duration of HVAC actuator operation. As noted above, the HVAC actuator gears or other components may become worn and/or the lubricant may become more viscous over time, creating more drag. The controller 14 may compensate for this by adjusting the torque supplied by the motor 12, sometimes based on the duration of time and/or time of use of the HVAC actuator 10. In some cases, the controller 14 may provide torque compensation in an attempt to maintain a relatively constant torque output for the HVAC actuator 10, sometimes at or near the torque rating of the HVAC actuator 10.

Figure 3:
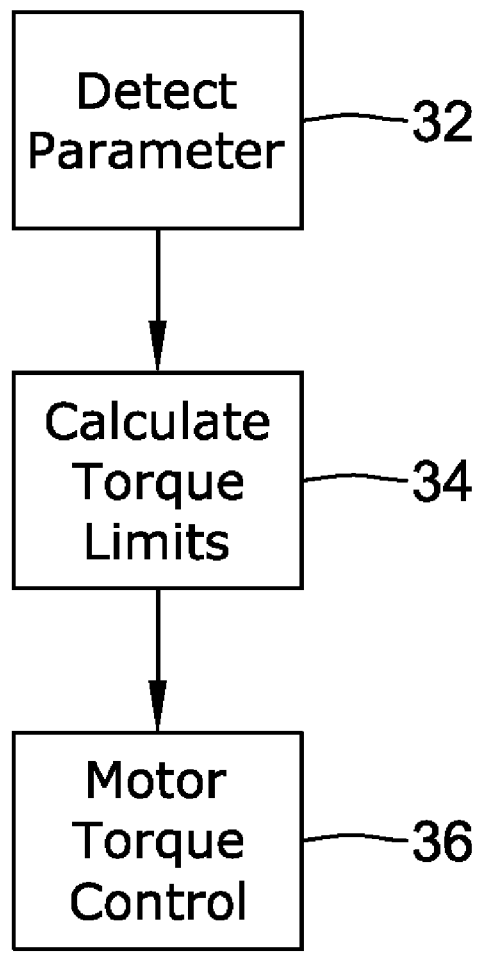
FIG. 3 is a flow diagram of an illustrative method of the present invention.

FIG. 3 is a flow diagram of an illustrative method in accordance with the present invention. As can be seen, the illustrative method may adjust the torque provide by the motor 12 based upon a detected operating condition or parameter of the HVAC actuator 10. In some cases, the torque compensation may be performed when a request to move the actuated part of the HVAC actuator is received. More generally, however, it is contemplated that the torque compensation may be performed at any time before, during and/or after actuation of the actuated part of the HVAC actuator, as desired. In some cases, the torque compensation may be performed periodically, in response to a request, randomly, or at any other time, as desired.

The illustrative method begins at step 32, which detects one or more operating conditions and/or parameters in or around the HVAC actuator 10. In some instances, a detector 18 may be provided for detecting the one or more operating conditions and/or parameters in or around the HVAC actuator 10. When so provided, the detector 18 may provide a signal that reflects the detected operating conditions and/or parameters.

In some illustrative embodiment, the one or more operating conditions and/or parameters may include temperature, age, time in operation, voltage, current, and/or any other operating condition and/or parameter, as desired.

In response to the detected operating condition and/or parameter, step 34 may calculate or otherwise produce one or more torque limits. In one illustrative embodiment, and referring back to FIG. 1, a controller 14 may calculate or otherwise produce one or more torque limit(s) (e.g. current limits) for the motor 12, wherein the one or more torque limit(s) are associated with and depend on the detected operating conditions and/or parameters.

In step 36, the torque limit(s) may then be used to control the motor torque. In the illustrative embodiment of FIG. 1, the torque limit(s) may cause the motor 12 to produce a torque that results in a relatively constant torque output at the actuated part 16 of the HVAC actuator 10, over a range of the detected operating conditions and/or parameters, but this is not required. In some embodiments, the controller 14 may control the current that is provided to the motor 12, which in turn, may control the torque of the motor 12. In some embodiments, the torque limits may be selected from a lookup table of torque limits stored in a memory of the controller 14, where the detected operating condition is used as an index into the lookup table, but this is not required. In addition, it is contemplated that the torque limits may be dependent on the direction of movement of the actuated part. For example, one set of torque limits for a given detected operating condition may be selected when the actuated part is to be moved in one direction, and another set of torque limits for the detected operating condition may be used when the actuated part is to be moved in the opposite direction. In some cases, and rather than using a look up table, it is contemplated that the torque limits may be calculated using one or more equations, as desired.

In some cases, various torque limits can be specified over the various operating conditions, and can be based on characterization data that is generated for the HVAC actuator. The characterization data can, for example, characterize a change in torque at the actuated part of an HVAC actuator over a temperature range. This characterization data can then be used to produce a set of torque limits, wherein the set of torque limits can be used to produce a desired torque at the actuated part of the HVAC actuator at any given temperature (e.g. a detected temperature). In some cases, by indexing the detected operating condition (e.g. temperature) into the set of torque limits, the HVAC actuator may produce a relatively constant torque output at the actuated part of the HVAC actuator.

Figure 4:
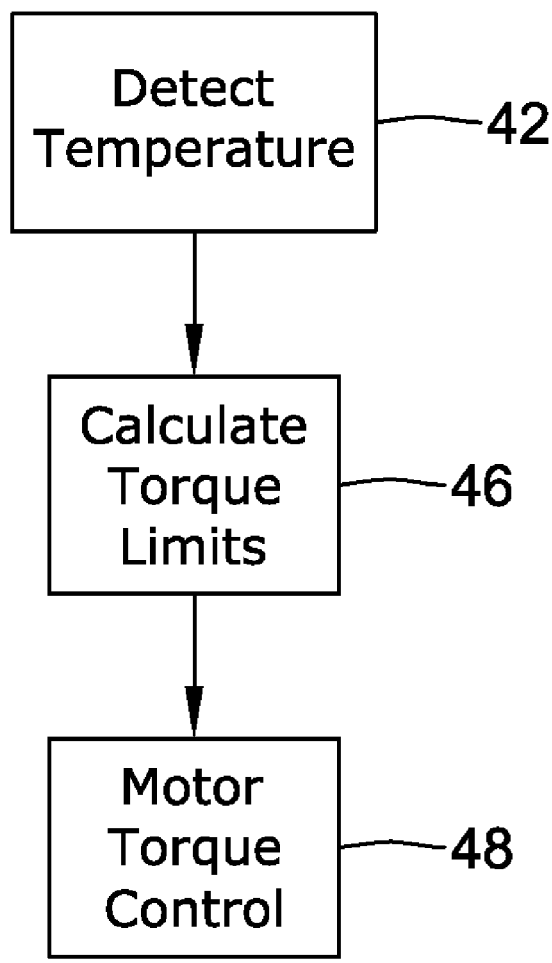
FIG. 4 is a flow diagram of another illustrative method of the present invention.

FIG. 4 is a flow diagram of another illustrative method in accordance with the present invention. The illustrative method of FIG. 4 is similar to that shown and described above with respect to FIG. 3, except that FIG. 4 is described with reference to a temperature of an HVAC actuator, and adjusting the motor torque based on the detected temperature of the HVAC actuator.

In step 42, a temperature in or around the HVAC actuator is detected. In some cases, a temperature detector (e.g. see FIG. 2) may be provided for sensing the temperature in or around the HVAC actuator. The temperature detector may send a signal to a controller 14 that reflects the detected temperature.

After detecting the temperature, step 46 may calculate or otherwise select one or more torque limit(s) for the motor of the HVAC actuator. The calculated or selected torque limit(s) may correspond to, and in some cases be unique to, the detected temperature value.

As shown at step 48, the torque limit(s) may be used to control the motor torque. For example, and in the illustrative embodiment of FIG. 1, the torque limit(s) may cause the motor 12 to produce a torque that results in a relatively constant torque output at the actuated part 16 of the HVAC actuator 10 over a range of temperature values, but this is not required.

Figure 5:
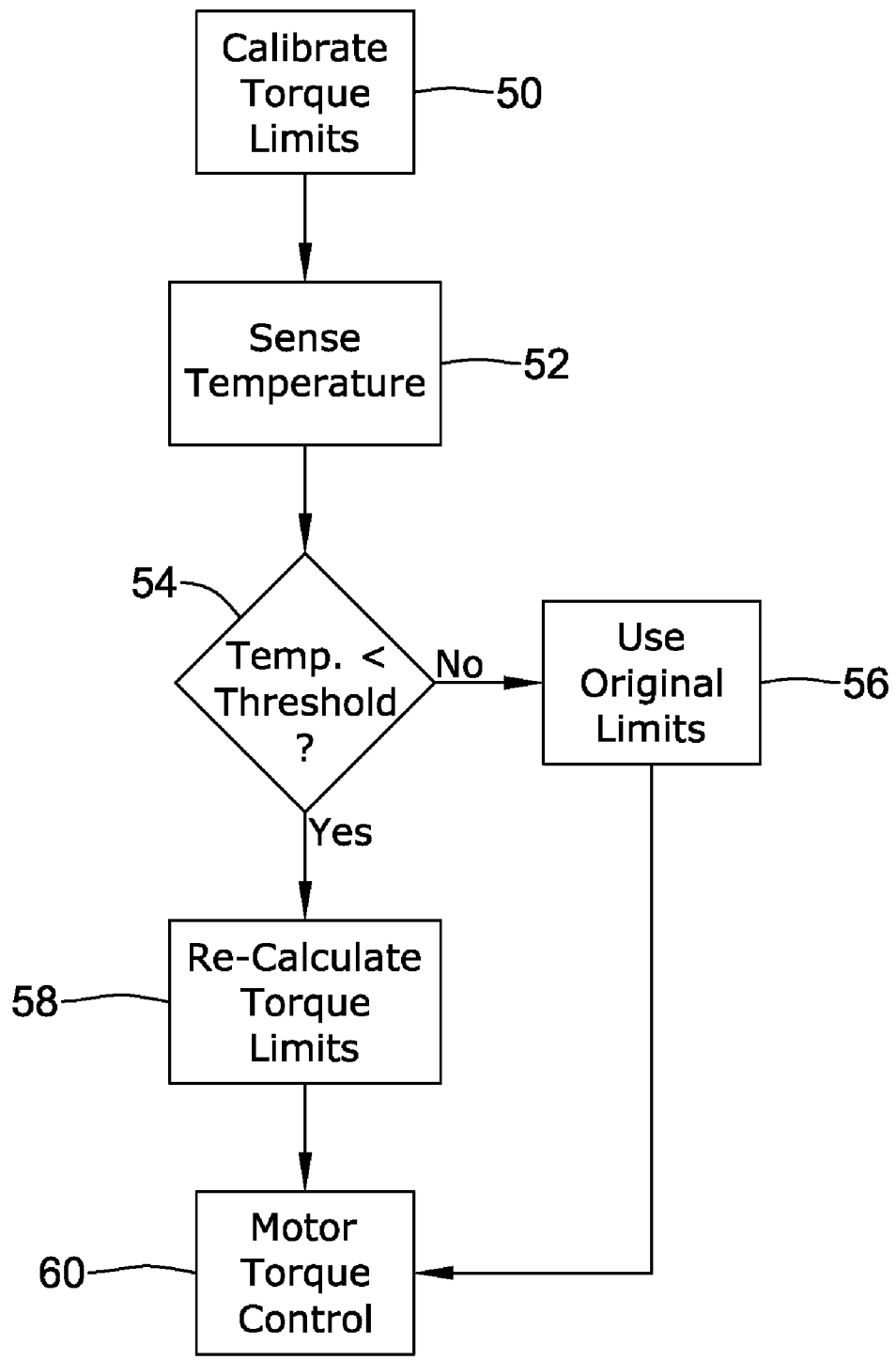
FIG. 5 is a flow diagram of another illustrative method of the present invention.

FIG. 5 is a flow diagram of another illustrative method in accordance with the present invention. As shown at step 50, a calibrated torque limit for the motor may be read from memory. The calibrated torque limits may be the amount of torque produced by the motor over certain operating conditions may be calibrated. In some cases, this calibration may be performed during installation of the HVAC actuator or in the factory. In some cases, the calibrated torque limits may be stored in the memory of the controller, such as, in the non-volatile memory including, for example, ROM, PROM, or EEPROM. However, any suitable memory may be used, as desired.

In the illustrative embodiment, the calibration may be performed at a known temperature. In some cases, this can be performed at room temperature. The reading calibrated torque limits step 50 may help identify the calibrated the torque limits (which are specified over a range of operating conditions) of a particular HVAC actuator at hand. Furthermore, in some cases, instead of reading in the calibrated torque limits, as shown in step 50, it is contemplated that the torque limits may be calibrated at step 50, if desired.

At step 52, a temperature in or around the HVAC actuator may be sensed, often using a detector. The detector may send a signal to a controller based, at least in part, on the sensed temperature in or around the HVAC actuator.

In some cases, the torque at the actuated part of an HVAC actuator does not vary much unless the temperature is below a threshold value. In one illustrative embodiment, the threshold temperature value is 14 degrees Fahrenheit, but this is only an example. As shown at step 54, it is next determined if the detected temperature is below the threshold temperature value. If the detected temperature is not below the threshold temperature value, control is passed to step 56. Step 56 selects the original (or default) calibrated torque limits, and passes control to step 60. If the detected temperature is below the threshold temperature value, control is passed to step 58. Step 58 re-calculates or selects new torque limits that correspond to the detected temperature value, and then passed control to step 60. Step 60 controls the motor using the calculated or selected torque limits. In some cases, the value of the new torque limits may be proportional or in some other way related to the temperature differential between the detected temperature value and the threshold temperature value, but this is not required.

In one illustrative method, the torque limits correspond to current limits for the current that is supplied to drive the electric motor. In many cases, the torque of an electric motor is directly related to the current that drives the electric motor. The recalculation or selection of the torque limits, based on the detected temperature value, may be performed using fixed point arithmetic and in some cases according to the following linear equation:

$$I = I_{cal} \frac{v_{Th} - v_{actual}}{v_{Th} - v_{Limit}} K$$

where:

$v_{actual}$ ... actual temperature
$v_{Th}$ ... threshold temperature
$v_{Limit}$ ... maximum operating temperature
$I_{cal}$ ... calibrated current limit
K ... configurable increase multiplier
I ... resultant current limit This is just one example of re-calculating the torque limits based on detected actual temperature.

In some cases, and as indicated above, it is contemplated that the torque limits may be dependent on the direction of movement of the actuated part of an HVAC actuator. For example, one set of torque limits for a given detected operating condition may be calculated or selected when the actuated part is to be moved in one direction, and another set of torque limits may be calculated or selected for the given detected operating condition may be used when the actuated part is to be moved in the opposite direction. Continuing with the above example, it is contemplated that the recalculation or selection of the torque limits, based on the detected temperature value, may be performed using fixed point arithmetic and in some cases according to the following linear equations:

$$I_{CW} = I_{CWcal} \frac{v_{Th} - v_{actual}}{v_{Th} - v_{Limit}} K_{CW}$$

$$I_{CCW} = I_{CCWcal} \frac{v_{Th} - v_{actual}}{v_{Th} - v_{Limit}} K_{CCW}$$

where:

$v_{actual}$ ... actual temperature
$v_{Th}$ ... threshold temperature
$v_{Limit}$ ... maximum operating temperature
$I_{CWcal}$ ... calibrated current limit for CW direction
$I_{CCWcal}$ ... calibrated current limit for CCW direction
$K_{CW}$ ... configurable increase multiplier for CW direction
$K_{CCW}$ ... configurable increase multiplier for CCW direction
$I_{CW}$ ... resultant current limit for CW direction
$I_{CCW}$ ... resultant current limit for CW direction Thus, in some illustrative embodiments, the torque limits (e.g. in this case current limits) may be recalculated for both clockwise and counter clockwise directions of the HVAC actuator. More generally, however, it is contemplated that any suitable method of recalculating the current or torque limits may be used, as desired.

In some cases, and instead of using arithmetic to calculate the torque limits for a given temperature, it is contemplated that a plurality of temperature ranges may be defined, with each temperature range having an associated torque limit or torque limits. For example, the operating temperature range of an HVAC actuator may be, for example, −40 to 150 degrees Fahrenheit. This operating temperature range may be divided into a plurality of smaller temperature segments, for example, in 1, 2, 3, 4, 5, 10, 20, or 25 degree segments, or any other segments as desired. Each segment may be associated with a particular torque limit or torque limits. In some cases, the associated torque limit(s) may be stored in memory, such as non-volatile memory, for each of the plurality of defined segments. For example, in 20 degree segments, from −40 to −20 degrees Fahrenheit, there may be stored a first torque limit, from −19.9 to 0 degrees Fahrenheit, there may be stored a second torque limit, from 0.01 to 20 degrees Fahrenheit, there may be stored a third torque limit, from 20.01 to 49 degrees Fahrenheit, there may be stored a fourth torque limit, and so on. Additionally, it is contemplated that there may be a threshold temperature so that any detected temperature that is above the threshold temperature up to the maximum operating temperature may use a common torque limit or torque limits, or it may be a default calibrated value, as desired.

Figure 6:
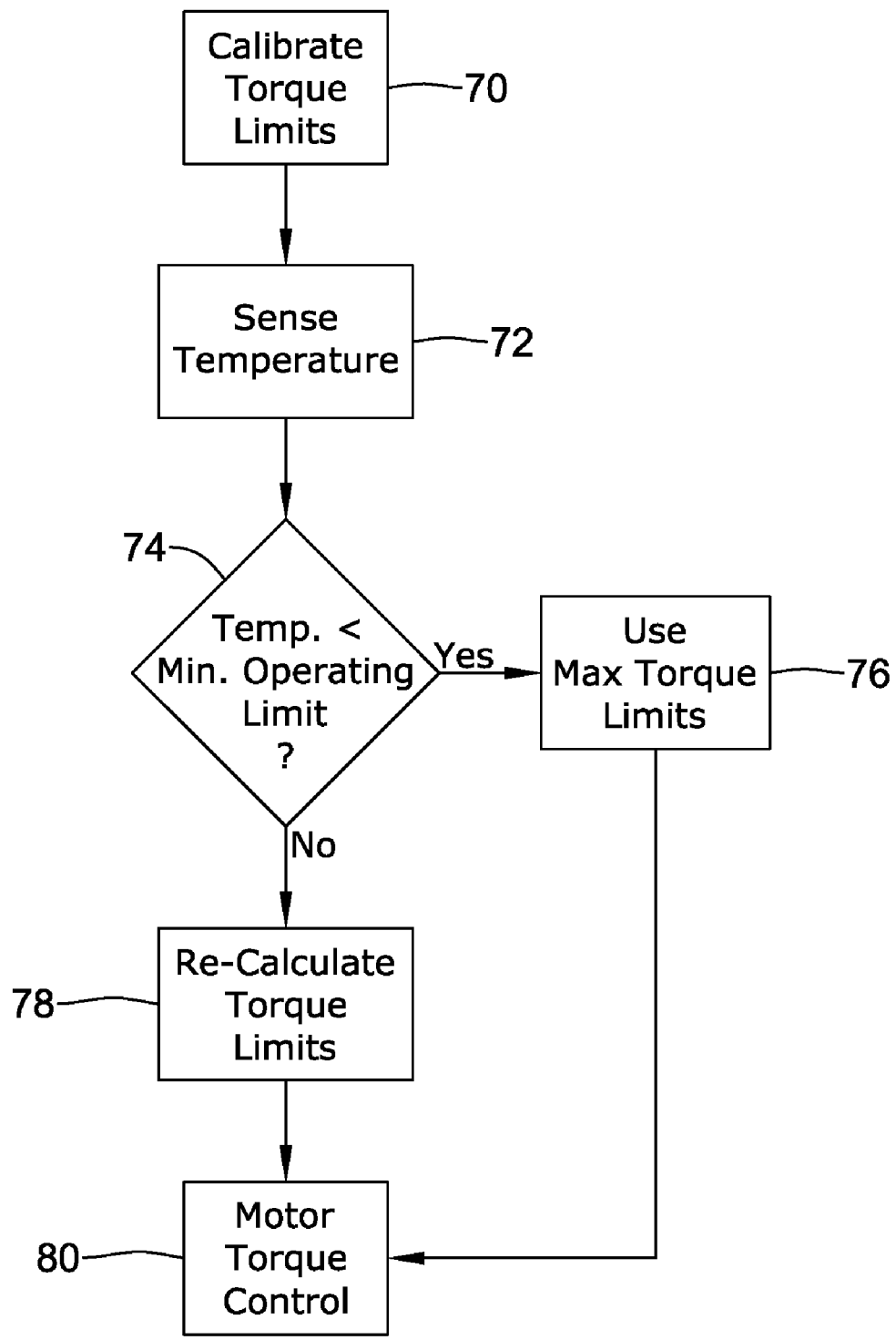
FIG. 6 is a flow diagram of another illustrative method of the present invention.

FIG. 6 is a flow diagram of another illustrative method in accordance with the present invention. As shown at step 70, the calibrated torque limits for the motor may be read from memory. The calibrated torque limits may be the amount of torque produced by the motor over certain operating conditions may be calibrated. In some cases, this calibration may be performed during installation of the HVAC actuator or in the factory. In some cases, the calibrated torque limits may be stored in the memory of the controller, such as, in the non-volatile memory including, for example, ROM, PROM, or EEPROM. However, any suitable memory may be used, as desired.

In the illustrative embodiment, the calibration may be performed at a known temperature. In some cases, this can be performed at room temperature. The reading calibrated torque limits step 70 may help identify the calibrated the torque limits (which are specified over a range of operating conditions) for a particular HVAC actuator at hand. Furthermore, in some cases, instead of reading in the calibrated torque limits, as shown in step 70, it is contemplated that the torque limits may be calibrated at step 70, if desired.

At step 72, a temperature in or around the HVAC actuator may be sensed, often using a detector. The detector may send a signal to a controller based, at least in part, on the sensed temperature in or around the HVAC actuator.

It is next determined if, for example, the detected temperature is outside of an operating temperature range specified for the HVAC actuator. For example, if the detected temperature is greater than the maximum operating temperature limit or if the detected temperature is less than the minimum operating temperature limit. Step 74 determines if the detected temperature is less than the minimum operating temperature limit for the HVAC actuator.

If the detected temperature is less than the minimum operating temperature limit, then, in block 76, the maximum torque limits are used, and control is passed to step 80. The maximum torque limits may be configurable. For example, the maximum torque limits may correspond to the torque limit that is specified for the lowest temperature in the operating temperature range of the HVAC actuator. Alternatively, the maximum torque limits may correspond to the maximum available torque that can be supplied by the motor (i.e. hardware limited).

Referring back to step 74, if the detected temperature is not less than the minimum operating temperature limit, then, in step 78, the controller may recalculate the torque limits for the specific detected temperature, similar to that discussed above, and control may be passed to step 80. Step 80 controls the motor using the calculated or selected torque limits from step 76 or step 78.

Figure 7:
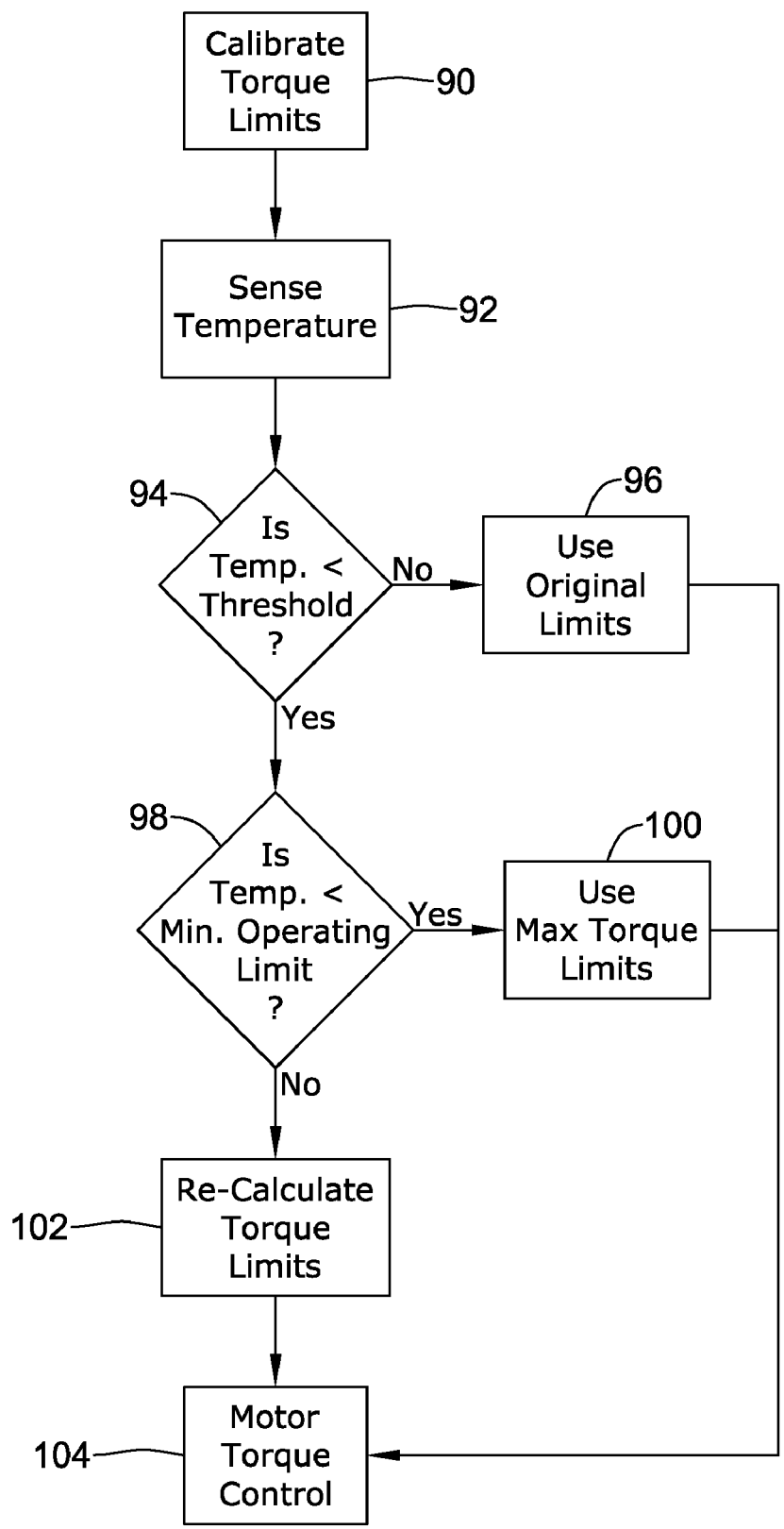
FIG. 7 is a flow diagram of another illustrative method of the present invention.

FIG. 7 is a flow diagram of another illustrative method in accordance with the present invention. As shown at step 90, the calibrated torque limits for the motor may be read from memory. The calibrated torque limits may be the amount of torque produced by the motor over certain operating conditions may be calibrated. In some cases, this calibration may be performed during installation of the HVAC actuator or in the factory. In some cases, the calibrated torque limits may be stored in the memory of the controller, such as, in the non-volatile memory including, for example, ROM, PROM, or EEPROM. However, any suitable memory may be used, as desired.

In the illustrative embodiment, the calibration may be performed at a known temperature. In some cases, this can be performed at room temperature. The reading calibrated torque limits step 90 may help identify the calibrated the torque limits (which are specified over a range of operating conditions) for a particular HVAC actuator at hand. Furthermore, in some cases, instead of reading in the calibrated torque limits, as shown in step 90, it is contemplated that the torque limits may be calibrated at step 90, if desired.

At step 92, a temperature in or around the HVAC actuator may be sensed, often using a detector. The detector may send a signal to a controller based, at least in part, on the sensed temperature in or around the HVAC actuator.

In some cases, the torque at the actuated part of an HVAC actuator does not vary much unless the temperature is below a threshold value. Thus, and as shown at step 94, it is next determined if the detected temperature is below the threshold temperature value. If the detected temperature is not below the threshold temperature value, control is passed to step 96. Step 96 selects the original (or default) calibrated torque limits, and passes control to step 104. If the detected temperature is below the threshold temperature value, control is passed to step 98.

It is next determined if, for example, the detected temperature is outside of an operating temperature range specified for the HVAC actuator. For example, step 98 determines if the detected temperature is less than the minimum operating temperature limit for the HVAC actuator. If the detected temperature is less than the minimum operating temperature limit, then, in block 100, the maximum torque limits are used, and control is passed to step 104. If, however, the detected temperature is not less than the minimum operating temperature limit, then, in step 102, the controller may recalculate the torque limits for the specific detected temperature, similar to that discussed above, and control may be passed to step 104. Step 104 controls the motor using the calculated or selected torque limits from steps 96, 100 or 102.

Having thus described the preferred embodiments of the present invention, those of skill in the art will readily appreciate that yet other embodiments may be made and used within the scope of the claims hereto attached. Numerous advantages of the invention covered by this document have been set forth in the foregoing description. It will be understood, however, that this disclosure is, in many respect, only illustrative. Changes may be made in details, particularly in matters of shape, size, and arrangement of parts without exceeding the scope of the invention. The invention's scope is, of course, defined in the language in which the appended claims are expressed.

The invention claimed is:

1. A HVAC actuator comprising:
   an actuated part;
   a motor coupled to the actuated part for moving the actuated part from a current position to an actuated position, the motor having an adjustable torque;
   a detector for detecting an operating condition of the HVAC actuator; and
   a controller coupled to the motor and to the detector, the controller receiving a signal from the detector that is related to the detected operating condition of the HVAC actuator, and adjusting the torque that is provided by the motor according to the detected operating condition, wherein the adjusted torque is used while the actuated part is moving from the current position to the actuated position.

2. The HVAC controller of claim 1 wherein the torque is adjusted if the detected operating condition is below a threshold value.

3. The HVAC controller of claim 1 wherein the detected operating condition includes a temperature.

4. The HVAC controller of claim 3 wherein the detector includes a thermistor to detect the temperature of the HVAC actuator.

5. The HVAC controller of claim 1 wherein the detected operating condition includes a time value.

6. The HVAC controller of claim 1 wherein the detector includes a counter.

7. A method of operating a controller for a HVAC actuator, the HVAC actuator having an actuated part, a motor coupled the actuated part for moving the actuated part from a current position to an actuated position, and the controller controlling the torque provided by the motor, the method comprising:
   receiving a detected operating condition of the HVAC actuator; and
   adjusting the torque provided by the motor based, as least in part, on the detected operating condition, wherein the adjusted torque is used while the HVAC actuated is moving from the current position to the actuated position.

8. The method of claim 7 wherein the detected operating condition includes a temperature.

9. The method of claim 8 further comprising:
   determining if the detected operating condition is below a threshold temperature; and
   wherein the torque adjusting step adjust the torque provided by the motor to a temperature dependent torque value if the detected operating condition is below the threshold temperature, and adjusts the torque provided by the motor to a default torque value if the detected operating condition is not below the threshold temperature.

10. The method of claim 9 further comprising the step of:
    measuring the torque of the HVAC actuator at a selected temperature resulting in a calibrated torque value; and
    calibrating the temperature dependent torque values using the calibrated torque value.

11. The method of claim 10 further comprising the step of:
    calibrating the default torque value using the calibrated torque value.

12. The method of claim 9 further comprising the step of:
    measuring the torque of the HVAC actuator at a selected temperature resulting in a calibrated torque value; and
    calibrating the default torque value using the calibrated torque value.

13. The method of claim 9 further comprising the step of:
    determining if the detected operating condition is below a minimum temperature limit; and
    wherein the torque adjusting step adjust the torque provided by the motor to a maximum torque value if the detected operating condition is below the minimum temperature limit.

14. A method of operating a HVAC actuator, the HVAC actuator including a motor and a detector, the method comprising:
    providing a controller programmed to provide a level of current to the motor to provide an amount of torque;
    detecting a temperature of the HVAC actuator resulting in a detected temperature value;
    adjusting the level of current provided by the controller to the motor, the adjusted level of current being based, as least in part, on the detected temperature value; and using the adjusted level of current while the HVAC actuated is moving from a current position to an actuated position.

15. The method of claim 14 further comprising:
comparing the detected temperature value to a threshold temperature value; and
performing the adjusting step if the detected temperature is less than the threshold temperature value.

16. The method of claim 14 further comprising:
determining if the detected temperature value is below a minimum temperature limit for the HVAC actuator;
wherein the adjusting step provides a predetermined maximum level of current if the detected temperature value is below the minimum temperature limit.

17. A HVAC actuator comprising:
an actuated part;
a motor coupled to the actuated part for moving the actuated part from a current position to an actuated position, the motor having an adjustable torque;
a detector for detecting a measure that is related to a time of use of the HVAC actuator; and
a controller coupled to the motor and to the detector, the controller receiving a signal from the detector that is related to the time of use of the HVAC actuator, and adjusting the torque that is provided by the motor according, at least in part, to the detected time of use of the HVAC actuator, wherein the adjusted torque is used while the actuated part is moving from the current position to the actuated position.

18. The HVAC actuator of claim 17 wherein the detector includes a timer.

19. The HVAC actuator of claim 17 wherein the detector includes a counter.

20. The HVAC actuator of claim 17 further comprising a temperature detector for detecting a temperature of the HVAC actuator, and the controller receives a signal from the temperature detector, the controller further adjusting the torque that is provided by the motor according to the detected temperature.

21. A HVAC actuator comprising:
an actuated part;
a motor that provides a torque to move the actuated part from a current position to an actuated position based upon a current received, wherein the torque required to move the actuated part from the current position to the actuated position varies depending upon the temperature of the HVAC actuator;
a detector for detecting the temperature of the HVAC actuator; and
a controller programmed to adjust the current provided to the motor according to the detected temperature of the HVAC actuator, wherein the adjusted current is used while the actuated part is moving from the current position to the actuated position.

* * * * *